US012761457B2

(12) United States Patent
Zou

(10) Patent No.: US 12,761,457 B2
(45) Date of Patent: *Oct. 13, 2026

(54) SUBPIXEL LINE SCANNING

(71) Applicant: Leica Biosystems Imaging, Inc., Vista, CA (US)

(72) Inventor: Yunlu Zou, San Diego, CA (US)

(73) Assignee: Leica Biosystems Imaging, Inc., Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/087,345

(22) Filed: Mar. 21, 2025

(65) Prior Publication Data

US 2025/0216662 A1 Jul. 3, 2025

Related U.S. Application Data

(63) Continuation of application No. 17/753,775, filed as application No. PCT/US2020/055241 on Oct. 12, 2020, now Pat. No. 12,282,145.

(Continued)

(51) Int. Cl.

*G02B 21/00* (2006.01)
*G02B 21/26* (2006.01)

(Continued)

(52) U.S. Cl.

CPC ....... *G02B 21/008* (2013.01); *G02B 21/0036* (2013.01); *G02B 21/0052* (2013.01);

(Continued)

(58) Field of Classification Search

None

See application file for complete search history.

(56) References Cited

U.S. PATENT DOCUMENTS 4,767,937 A 8/1988 Norsworthy
7,176,433 B1 2/2007 Rosengaus (Continued)

FOREIGN PATENT DOCUMENTS

EP 0070620 A2 1/1983
EP 1184703 A1 3/2002

(Continued)

OTHER PUBLICATIONS

European Extended Search Report and Written Opinion dated May 13, 2025, for Application No. 24218320.0, 13 pages.

(Continued)

*Primary Examiner* — Samira Monshi

(74) *Attorney, Agent, or Firm* — FBT Gibbons LLP

(57) ABSTRACT

Subpixel line scanning. A slide scanning device comprises a plurality of line sensors, each comprising a plurality of pixel sensors. Each line sensor is offset from an adjacent line sensor by a fraction of a length of each pixel sensor, and generates a line image of the same field of view at its respective offset. For each of a plurality of positions on a sample, a processor combines the line images of the same field of view, generated by the plurality of line sensors at their respective offsets, to produce a plurality of subpixels for each of at least a subset of pixels within the line images of the same field of view, and generates an upsampled line image of the position comprising the plurality of subpixels. Then, the processor combines the up-sampled line images of each of the plurality of positions on the sample into an image.

12 Claims, 6 Drawing Sheets

Related U.S. Application Data

(60) Provisional application No. 62/914,879, filed on Oct. 14, 2019.

(51) Int. Cl.
*H04N 25/48* (2023.01)
*H04N 25/701* (2023.01)

(52) U.S. Cl.
CPC ............. *G02B 21/26* (2013.01); *H04N 25/48* (2023.01); *H04N 25/701* (2023.01)

(56) References Cited

U.S. PATENT DOCUMENTS

| | | | | |
|---|---|---|---|---|
| 12,282,145 | B2 | 4/2025 | Zou | |
| 2011/0013202 | A1 | 1/2011 | Muramatsu | |
| 2014/0009597 | A1* | 1/2014 | Abe | G06V 20/693 348/80 |
| 2015/0153555 | A1 | 6/2015 | Loney et al. | |
| 2015/0156396 | A1* | 6/2015 | Oishi | H04N 23/45 348/79 |
| 2015/0281617 | A1* | 10/2015 | Ichimiya | G02B 7/346 348/322 |
| 2018/0275388 | A1 | 9/2018 | Zou et al. | |
| 2019/0285734 | A1* | 9/2019 | Van Lierop | G01S 7/4863 |

FOREIGN PATENT DOCUMENTS

| | | | |
|---|---|---|---|
| EP | 2937835 | A1 | 10/2015 |
| EP | 3383026 | A1 | 10/2018 |
| JP | H06-178075 | A | 6/1994 |
| JP | H11-341367 | A | 12/1999 |
| KR | 2009-0080060 | A | 7/2009 |
| WO | 2002/091424 | A1 | 11/2002 |

OTHER PUBLICATIONS

International Search Report and Written Opinion dated Feb. 5, 2021, for International Application No. PCT/US2020/055241, 16 pages.

Korean Notice of Allowance dated Feb. 24, 2025, for Application No. 2022-7012442, 4 pages.

* cited by examiner

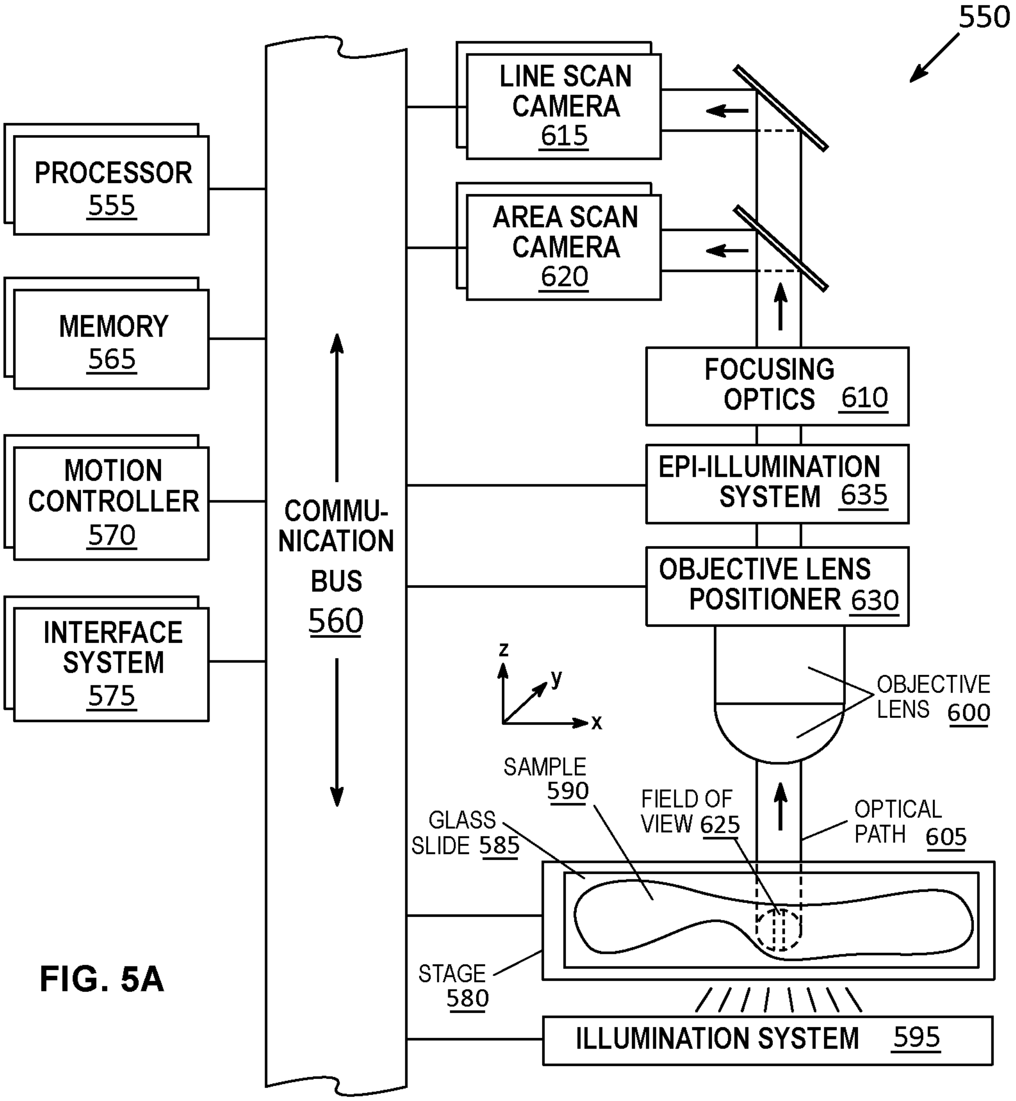
FIG. 5A
FIG. 5B
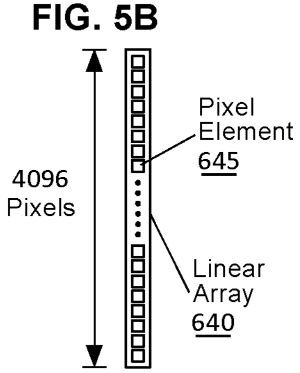
FIG. 5C
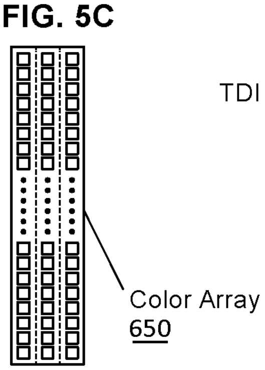
FIG. 5D
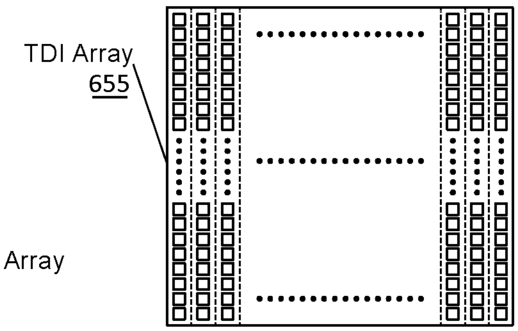

SUBPIXEL LINE SCANNING

CROSS-REFERENCE TO RELATED APPLICATIONS

The present application claims priority to U.S. application Ser. No. 17/753,775, filed Mar. 14, 2022, which is a national stage entry of and claims the benefit of international application PCT/US2020/055241, which itself claims the benefit of U.S. Provisional Patent App. No. 62/914,879, filed on Oct. 14, 2019. The disclosures of each of the foregoing application is hereby incorporated herein by reference as if set forth in full.

BACKGROUND

Field of the Invention

The present application generally relates to whole-slide imaging, and, more particularly, to sub-pixel scanning of samples on microscope slides.

Related Art

Current pixel-shifting technology enhances resolution by moving an image sensor in increments that are smaller in length than the width of a pixel. For example, to sample a subpixel that is a quarter of the size of a pixel, a first image including the subpixel is imaged, the image sensor is moved to the left by half a pixel and a second image including the subpixel is imaged, the image sensor is moved up by half a pixel and a third image including the subpixel is imaged, and the image sensor is moved to the right by half a pixel and a fourth image including the subpixel is imaged. The intensities in the four images are then combined to generate the subpixel.

SUMMARY

In an embodiment, a slide scanning device is disclosed that comprises: a stage which supports a microscope slide having a sample; a plurality of line sensors, wherein each of the plurality of line sensors comprises a plurality of pixel sensors, and wherein each of the plurality of line sensors, in a longitudinal direction of the line sensor, is offset from an adjacent one of the plurality of line sensors by a fraction of a length of each pixel sensor; an objective lens that provides a same field of view of the sample to each of the plurality of line sensors, successively, such that, for each of a plurality of positions on the sample, each of the plurality of line sensors senses the same field of view of the position and generates a line image of the same field of view of the position at the line sensor's respective offset; and at least one hardware processor that, for each of the plurality of positions on the sample, combines the line images of the same field of view, generated by the plurality of line sensors at their respective offsets, to produce a plurality of subpixels for each of at least a subset of pixels within the line images of the same field of view, and generates an up-sampled line image of the position comprising the produced plurality of subpixels, and combines the up-sampled line images of each of the plurality of positions on the sample into an image. The plurality of line sensors may consist of N line sensors, wherein the fraction of the length of each pixel sensor, by which each of the plurality of line sensors is offset from an adjacent line sensor, is 1/Nth. For each of the plurality of positions on the sample, the line images of the same field of view may comprise a line image for N offsets from zero to (N−1)/N. For each of the plurality of positions on the sample, combining the line images of the same field of view may comprise, for each of the at least a subset of pixels, summing intensity values for the pixel from each of the line images at their respective offsets. The at least one hardware processor may: combine the up-sampled line images of each of the plurality of positions on the sample into a plurality of image stripes; and align each of the plurality of images stripes with at least one adjacent one of the plurality of image stripes into a contiguous digital image.

In an embodiment, a method is disclosed that comprises using at least one hardware processor to: receive image data from a plurality of line sensors, wherein each of the plurality of line sensors comprises a plurality of pixel sensors, and wherein each of the plurality of line sensors, in a longitudinal direction of the line sensor, is offset from an adjacent one of the plurality of line sensors by a fraction of a length of each pixel sensor; control an objective lens that provides a same field of view of a sample to each of the plurality of line sensors, successively, such that, for each of a plurality of positions on the sample, each of the plurality of line sensors senses the same field of view of the position and generates a line image of the same field of view of the position at the line sensor's respective offset; for each of the plurality of positions on the sample, combine the line images of the same field of view, generated by the plurality of line sensors at their respective offsets, to produce a plurality of subpixels for each of at least a subset of pixels within the line images of the same field of view, and generate an up-sampled line image of the position comprising the produced plurality of subpixels; and combine the up-sampled line images of each of the plurality of positions on the sample into an image.

In an embodiment, a non-transitory computer-readable is disclosed having instructions stored thereon, wherein the instructions, when executed by a processor, cause the processor to: receive image data from a plurality of line sensors, wherein each of the plurality of line sensors comprises a plurality of pixel sensors, and wherein each of the plurality of line sensors, in a longitudinal direction of the line sensor, is offset from an adjacent one of the plurality of line sensors by a fraction of a length of each pixel sensor; control an objective lens that provides a same field of view of a sample to each of the plurality of line sensors, successively, such that, for each of a plurality of positions on the sample, each of the plurality of line sensors senses the same field of view of the position and generates a line image of the same field of view of the position at the line sensor's respective offset; for each of the plurality of positions on the sample, combine the line images of the same field of view, generated by the plurality of line sensors at their respective offsets, to produce a plurality of subpixels for each of at least a subset of pixels within the line images of the same field of view, and generate an up-sampled line image of the position comprising the produced plurality of subpixels; and combine the up-sampled line images of each of the plurality of positions on the sample into an image.

In an embodiment, a slide scanning device is disclosed that comprises: a stage which supports a microscope slide having a sample; a line scan camera comprising a two-dimensional array of pixel sensors, wherein the two-dimensional array comprises columns parallel to a first axis and rows parallel to a second axis that is orthogonal to the first axis; an objective lens that provides a same field of view of the sample to each of a plurality of rows in the two-dimensional array, successively, such that, for each of a plurality of positions on the sample, each of the plurality of rows senses the same field of view of the position and generates a line image of the same field of view of the position; and at least one hardware processor that, for each of the plurality of positions on the sample, controls one or more of the stage, the objective lens, and the line scan camera, such that the field of view of the sample, provided to the plurality of rows in the two-dimensional array, moves across the plurality of rows in the two-dimensional array at a non-zero angle with respect to the first axis and the second axis, such that each row in the plurality of rows senses the same field of view at an offset equal to a different fraction of a length of each pixel sensor, combines the line images of the same field of view, generated by the plurality of rows in the two-dimensional array at their respective offsets, to produce a plurality of subpixels for each of at least a subset of pixels within the line images of the same field of view, and generates an up-sampled line image of the position comprising the produced plurality of subpixels, and combines the up-sampled line images of each of the plurality of positions on the sample into an image. The stage may be a motorized stage, and controlling one or more of the stage, the objective lens, and the line scan camera may comprise controlling the motorized stage to move relative to the objective lens. The plurality of rows may consist of N rows, wherein the angle with respect to the first axis is equal to an arctangent of 1/N. For each of the plurality of positions on the sample, the line images of the same field of view may comprise a line image for N offsets from zero to (N−1)/N.

In an embodiment, a method is disclosed that comprises using at least one hardware processor to: receive image data from a line scan camera comprising a two-dimensional array of pixel sensors, wherein the two-dimensional array comprises columns parallel to a first axis and rows parallel to a second axis that is orthogonal to the first axis; control an objective lens that provides a same field of view of a sample to each of a plurality of rows in the two-dimensional array, successively, such that, for each of a plurality of positions on the sample, each of the plurality of rows senses the same field of view of the position and generates a line image of the same field of view of the position; for each of the plurality of positions on the sample, control one or more of a stage, the objective lens, and the line scan camera, such that the field of view of the sample, provided to the plurality of rows in the two-dimensional array, moves across the plurality of rows in the two-dimensional array at a non-zero angle with respect to the first axis and the second axis, such that each row in the plurality of rows senses the same field of view at an offset equal to a different fraction of a length of each pixel sensor, combines the line images of the same field of view, generated by the plurality of rows in the two-dimensional array at their respective offsets, to produce a plurality of subpixels for each of at least a subset of pixels within the line images of the same field of view, and generates an up-sampled line image of the position comprising the produced plurality of subpixels; and combines the up-sampled line images of each of the plurality of positions on the sample into an image.

In an embodiment, a non-transitory computer-readable is disclosed having instructions stored thereon, wherein the instructions, when executed by a processor, cause the processor to: receive image data from a line scan camera comprising a two-dimensional array of pixel sensors, wherein the two-dimensional array comprises columns parallel to a first axis and rows parallel to a second axis that is orthogonal to the first axis; control an objective lens that provides a same field of view of a sample to each of a plurality of rows in the two-dimensional array, successively, such that, for each of a plurality of positions on the sample, each of the plurality of rows senses the same field of view of the position and generates a line image of the same field of view of the position; for each of the plurality of positions on the sample, control one or more of a stage, the objective lens, and the line scan camera, such that the field of view of the sample, provided to the plurality of rows in the two-dimensional array, moves across the plurality of rows in the two-dimensional array at a non-zero angle with respect to the first axis and the second axis, such that each row in the plurality of rows senses the same field of view at an offset equal to a different fraction of a length of each pixel sensor, combines the line images of the same field of view, generated by the plurality of rows in the two-dimensional array at their respective offsets, to produce a plurality of subpixels for each of at least a subset of pixels within the line images of the same field of view, and generates an up-sampled line image of the position comprising the produced plurality of subpixels; and combines the up-sampled line images of each of the plurality of positions on the sample into an image.

Other features and advantages of the present invention will become readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which:

FIG. 5A illustrates a processor-enabled device that may be used in connection with various embodiments described herein, according to an embodiment;

FIG. 5B illustrates a line scan camera having a single linear array, according to an embodiment;

FIG. 5C illustrates a line scan camera having three linear arrays, according to an embodiment; and FIG. 5D is a block diagram illustrating a line scan camera having a plurality of linear arrays, according to an embodiment.

DETAILED DESCRIPTION

In general, the resolution of a digital imaging device is limited by the pixel size of the sensors and the resolution of the imaging optics. However, certain embodiments disclosed herein provide for a digital imaging device (e.g., digital slide scanner) that utilizes pixel-shifting to efficiently capture images at a higher resolution than could otherwise be captured by the size of the pixel-generating elements in its image sensor(s), while utilizing standard imaging optics at reasonable cost. In addition, the disclosed schemes can provide solutions for overcoming the field-of-view limit that is usually tied to the required pixel resolution of digital slide scanners, thereby resulting in faster scanning, especially in a line-scan mechanism.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

1. Offset Line Sensors

In a first embodiment, the image sensor comprises a plurality of line sensors which are logically offset from each other, in their longitudinal directions, by a distance equal to a fraction of a pixel length. Thus, as each successive line sensor receives light from the same portion of a sample, that line sensor generates a line of image data (also referred to herein as a "line image") that is slightly offset (i.e., by the fraction of a pixel length) from the line of image data generated by the preceding line sensor. While this offset can be a physical offset of a plurality of line sensors in space, in an alternative embodiment, the offset may instead be induced by shifting a single line sensor in space at a defined time interval.

Figure 1A:
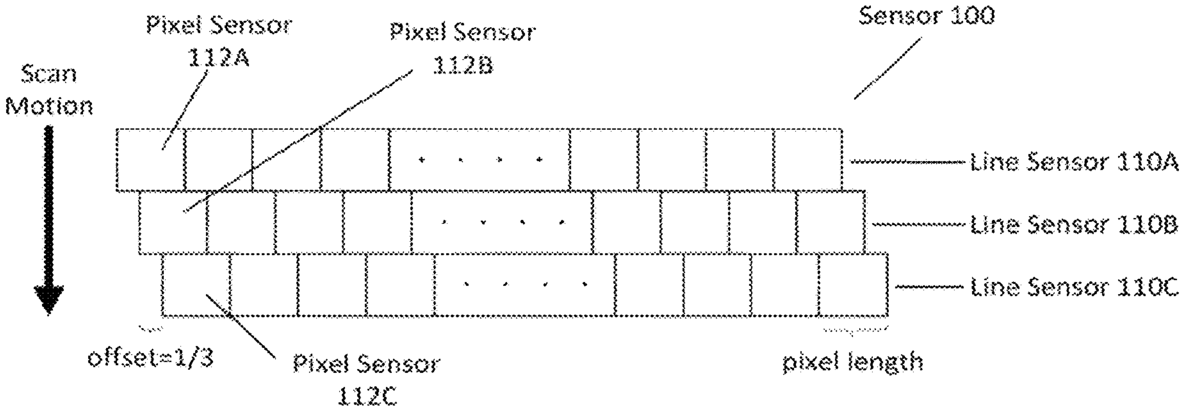
FIG. 1A illustrates an array of offset line sensors, according to a first embodiment.

FIG. 1A illustrates a sensor 100, comprising three offset line sensors 110, according to an embodiment. In a direction orthogonal to the direction of the scan motion, each of the line sensors 110 is offset from its adjacent line sensor(s) by a fraction of a pixel length. The direction of the scan motion indicates the direction that the field of view, being imaged, moves, relative to sensor 100. The scan motion may be implemented my moving a sample (e.g., by moving a motorized stage on which the sample is supported) with respect to the optical path provided to the image sensor and/or by moving the optical path with respect to the sample (e.g., by moving the image sensor and/or objective lens of the scanning device).

Although FIG. 1A shows one line for each line sensor 110, each line sensor 110 could comprise a set of multiple line sensors. For example, each line sensor 110 may comprise a set of three color sensors (e.g., three lines representing a trilinear sensor). In addition, although sensor 100 is illustrated with three offset line sensors (i.e., line sensors 110A, 110B, and 110C), sensor 100 may have any number of multiple line sensors 110. Generally, if N offset line sensors 110 are used, each of the N line sensors 110 should be offset from its adjacent line sensor(s) 110 by 1/Nth of the length of a pixel sensor 112. It should be understood that each line sensor 110 captures the same line image as each of the other line sensors 110, but offset by 1/Nth of a pixel length with respect to the same line image captured by each adjacent line sensor 110. This produces, for each line image in the whole slide image, N lines of the same image data, but, again, with the image data in each line image offset by 1/Nth of a pixel length from the image data in the line image captured by an adjacent line sensor.

In the illustrated embodiment with three offset line sensors 110 (i.e., 110A, 110B, and 110C), line sensor 110B is offset from line sensor 110A by one-third of a pixel length, and line sensor 110C is offset from line sensor 110B by one-third of a pixel length and offset from line sensor 110A by two-thirds of a pixel length. In an embodiment with two offset line sensors 110, each line sensor would be offset from the other line sensor by one half of a pixel length. Similarly, in an embodiment with four offset line sensors 110, each line sensor would be offset from its adjacent line sensor(s) by one-fourth of a pixel length.

Although sensor 100 is illustrated with offset line sensors offset towards a particular side (i.e., towards the right side of FIG. 1A), the offset line sensors may instead be offset towards the other side (i.e., towards the left side of FIG. 1A) without any change to the techniques described herein.

Figure 1B:
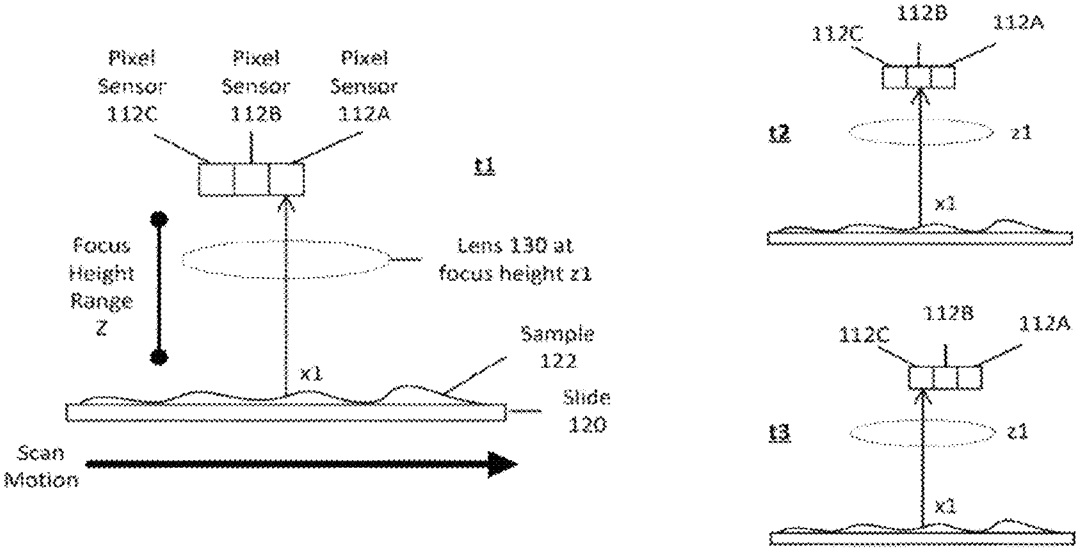
FIG. 1B illustrates the relationship between various components of a digital imaging device that includes the sensor in FIG. 1A, according to an embodiment.

FIG. 1B illustrates how offset pixels are captured by pixel sensors 112, according to an embodiment. Compared to a single line sensor with the same optics for low-resolution (i.e., native or non-sub-pixel) imaging, the speed of the scanning motion for a sensor 100 that utilizes N offset line sensors for high-resolution (i.e., sub-pixel) imaging should be N times slower. This is because each line image needs to be captured N times at N different offsets. Thus, in the illustrated embodiment with three line sensors 110, in order to achieve the same line rate as a sensor with only a single line sensor, the speed of the scanning motion should be three times slower than the speed of the scanning motion for the sensor with only a single line sensor.

FIG. 1B illustrates the logical positions of pixel sensors 112A, 112B, and 112C, with respect to a lens 130 (e.g., an objective lens described elsewhere herein) and a sample 122 on a slide 120, at times t1, t2, and t3. As discussed above, the scanning speed of sensor 100 for high-resolution imaging may be set to three times slower than the scanning speed of a sensor consisting of only a single line sensor for low-resolution imaging, such that each of times t1, t2, and t3 takes the time of the single line sensor to capture a single line of image data.

As illustrated in FIG. 1B, at time t1, position x1 of sample 122 is within the field of view provided by lens 130, while lens 130 is at a focus height z1. The view of position x1 on sample 122 is provided by lens 130, via an optical path, to line sensor 110A, including pixel sensor 112A of line sensor 110A. Thus, pixel sensor 112A generates a first pixel of image data representing a pixel-sized portion of sample 122 at position x1.

At time t2, position x1 on sample 122 remains within the field of view provided by lens 130, while lens 130 remains at focus height z1. However, the view of position x1 on sample 122 has moved in the direction of the scan motion, such that the view of position x1 on sample 122 is provided by lens 130, via an optical path, to line sensor 110B, including pixel sensor 112B of line sensor 110B. Thus, pixel sensor 112B generates a second pixel of image data representing a pixel-sized portion of sample 122 at position x1. This second pixel is offset from the first pixel by one-third of a pixel length.

At time t3, position x1 on sample 122 remains within the field of view provided by lens 130, while lens 130 remains at focus height z1. However, the view of position x1 on sample 122 has moved in the direction of the scan motion, such that the view of position x1 on sample 122 is provided by lens 130, via an optical path, to line sensor 110C, including pixel sensor 112C of line sensor 110C. Thus, pixel sensor 112C generates a third pixel of image data representing a pixel-sized portion of sample 122 at position x1. This third pixel is offset from the first pixel by two-thirds of a pixel length, and offset from the second pixel by one-third of a pixel length.

Accordingly, in a sensor 100 with three offset line sensors 110, each pixel that is captured (i.e., representing a pixel-sized portion of sample 122) is captured three times at three different offsets (i.e., zero offset, offset by one-third of a pixel length, and offset by two-thirds of a pixel length).

Similarly, in a sensor with two offset line sensors 110, each pixel would be captured twice at two different offsets (i.e., zero offset and offset by one half of a pixel length). In a sensor with four offset line sensors 110, each pixel would be captured four times at four different offsets (i.e., zero offset, offset by one-fourth of a pixel length, offset by two-fourths of a pixel length, and offset by three-fourths of a pixel length).

In each case, each offset pixel may be combined, in a manner described elsewhere herein, to generate N subpixels. Thus, in the case of three offset line sensors 110, three subpixels would be generated for each pixel. In the case of two offset line sensors 110, two subpixels would be generated for each pixel. In the case of four offset line sensors 110, four subpixels would be generated for each pixel.

While examples with two, three, and four line sensors 110 have been described, it should be understood that the techniques described herein can be extrapolated to any N line sensors 110 (e.g., five, ten, etc.) to achieve N subpixels for each pixel. In an embodiment, during each time (e.g., t1, t2, t3) at which the same position (e.g., x1) on sample 122 is being imaged by one of the N offset line sensor 110, lens 130 may remain at the same focus height (e.g., z1), such that each pixel is generated with the same focus. The focus height may be adjusted, if appropriate to maintain optimal focus (e.g., based on a focus map or other auto-focus technique), once the same position has been imaged by each of the N offset line sensors 110 in sensor 100.

In an alternative embodiment, a single line sensor 110 could be used to achieve the same effect as sensor 100 with N line sensors 110 by scanning each linear portion of the sample N times, while shifting the position, being imaged on the sample, N−1 times (i.e., between each individual scan of the same linear portion). In such an embodiment, each time the logical position of the sample is shifted relative to the line sensor 110, the logical position is shifted by a length that is 1/Nth of the length of a pixel sensor 112, such that N line images are captured from an offset of zero to an offset of (N−1)/Nth of a pixel length. Once N line images have been generated for the same linear portion, the logical position of the sensor 110, relative to the sample, is moved so that the next linear portion may be imaged N times, beginning from a zero offset and ending with an offset of (N−1)/Nth of a pixel length.

2. Angled Scan Motion

In an alternative second embodiment, the scanning motion follows a trajectory that is angled with respect to the image sensor. In other words, instead of an array of a plurality of offset line sensors, the image sensor may comprise one or more sensors that are flush (i.e., not offset), but which scan at an angled trajectory. Thus, standard image sensors can be adapted to achieve the same offset line images as the offset line sensors in the first embodiment.

Figure 2:
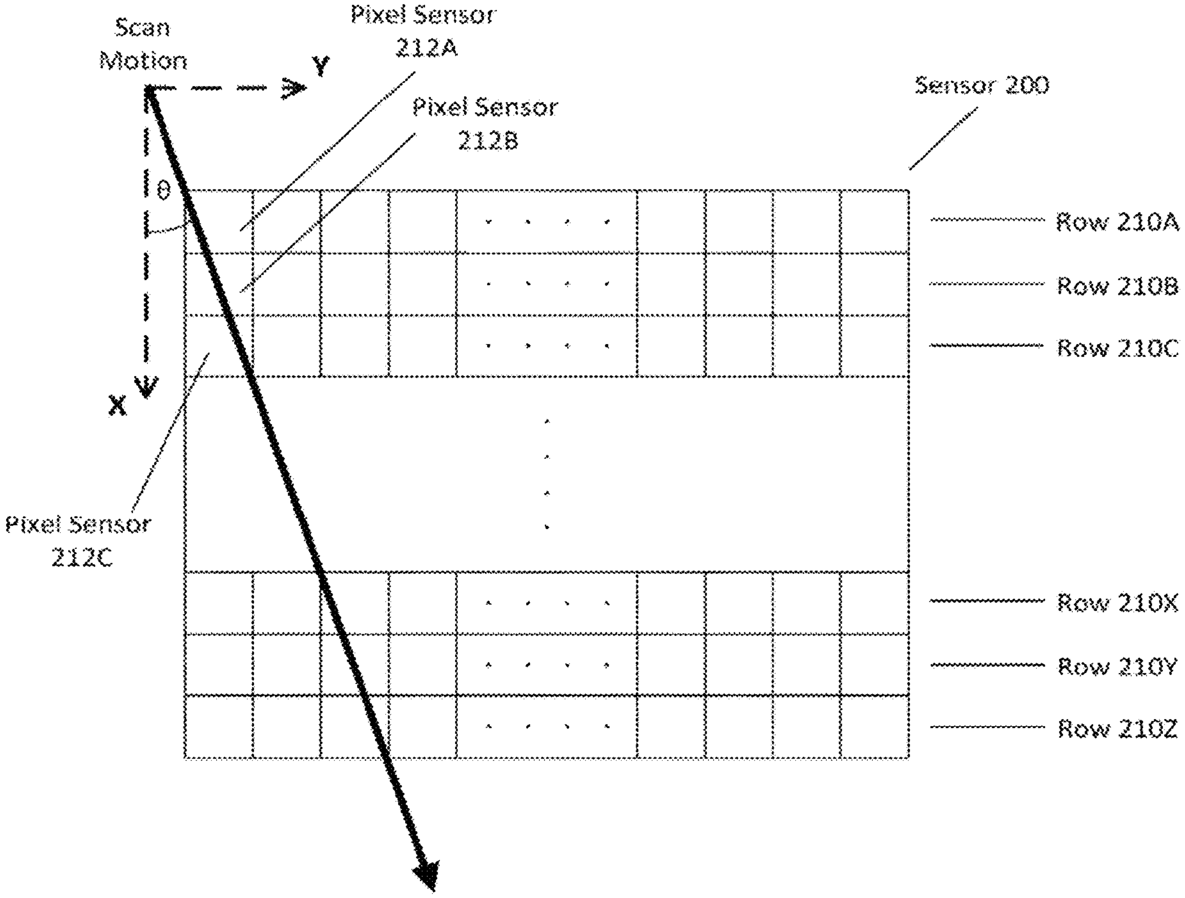
FIG. 2 illustrates a sensor, according to a second embodiment.

FIG. 2 illustrates a sensor 200, which scans at an angled trajectory, according to an embodiment. As illustrated, sensor 200 comprises a line scan camera having a plurality of pixel sensors 212 arranged in a two-dimensional array with rows 210 and columns. Alternatively, sensor 200 may comprise an area scan camera.

In embodiments in which a line scan camera is used, sensor 200 may comprise a time delay integration (TDI) line scan camera. The Piranha XL™, from Teledyne DALSA Inc. in Waterloo, Ontario, Canada, is an example of a TDI line scan camera that may be used as the line scan camera in such an embodiment. TDI line scan cameras comprise multiple stages of line sensors (e.g., 24, 32, 48, 64, 96, etc.), which each capture the same line image. The intensity data from each line image are then summed to provide an output line image with a substantially better signal-to-noise (SNR) ratio. For example, line images captured by row 210A of pixel sensors 212, row 210B of pixel sensors 212, and so on, through row 210Z of pixel sensors 212, would be integrated in this manner to produce a single output line image.

However, in embodiments which utilize a TDI line scan camera, the TDI line scan camera can be switched from a TDI mode to an area mode. In the area mode, the line images generated by rows 210 are not summed into a single output line image. Rather, in the area mode, each line image represents a different line of image data at a different position on the sample.

The motion of a position on the sample being imaged by sensor 200, relative to sensor 200, follows a direction at an angle θ with respect to an X axis that is orthogonal to the longitudinal direction of each row 210 and parallel to the longitudinal direction of the columns of sensor 200. Angle 0 should be equal to the inverse tangent of N−1 (i.e., θ=arctan (1/N)), where N is the number of subpixels desired for each pixel. In order to maintain the same line rate as a sensor 200 which moves parallel to the X axis and does not implement the subpixel technique described herein, the speed of the scan motion should be $$v_1 = N * v_o * \cos\theta,$$

wherein $v_o$ represents the speed of the sensor moving parallel to the X axis and not capturing each pixel at N offsets.

As sensor 200 images a position on the sample along the angled trajectory, the relative movement between sensor 200 and the sample is set, such that each set of N rows is used to capture the same line of image data. For example, in the illustrated embodiment where N=3, rows 210A, 210B, and 210C are each used to capture a line image at the same position xi along the X axis (e.g., at times t1, t2, and t3, respectively). Similarly, rows 210X, 210Y, and 210Z are each used to capture a line image at the same position $x_2$ along the X axis, where $x_2 > x_i$. The line image produced by each subset of N rows 210 represents the same linear portion of the sample, but offset at N different positions. In other words, the output is the same as in the first embodiment. Specifically, for each position on the sample that is imaged by the image sensor, N linear images are produced that are each offset by 1/Nth of a pixel length from the linear image captured by each adjacent line sensor 110 or row 210. Where N=3, three line images would be produced for each position on the same, including a first line image having zero offset, a second line image having an offset of one-third of a pixel length, and a third line image having an offset of two-thirds of a pixel length.

Notably, sensor 200 captures fewer line images than would otherwise be captured if each row 210 was used to capture a different linear portion of the sample. Specifically, if sensor 200 comprises M rows 210 (e.g., an M-stage TDI line scan camera), sensor 200 outputs M/N line images at a time, rather than the M line images that would be output if each row 210 was used to capture a different linear portion of the sample.

3. Subpixel Generation

Figure 3A:
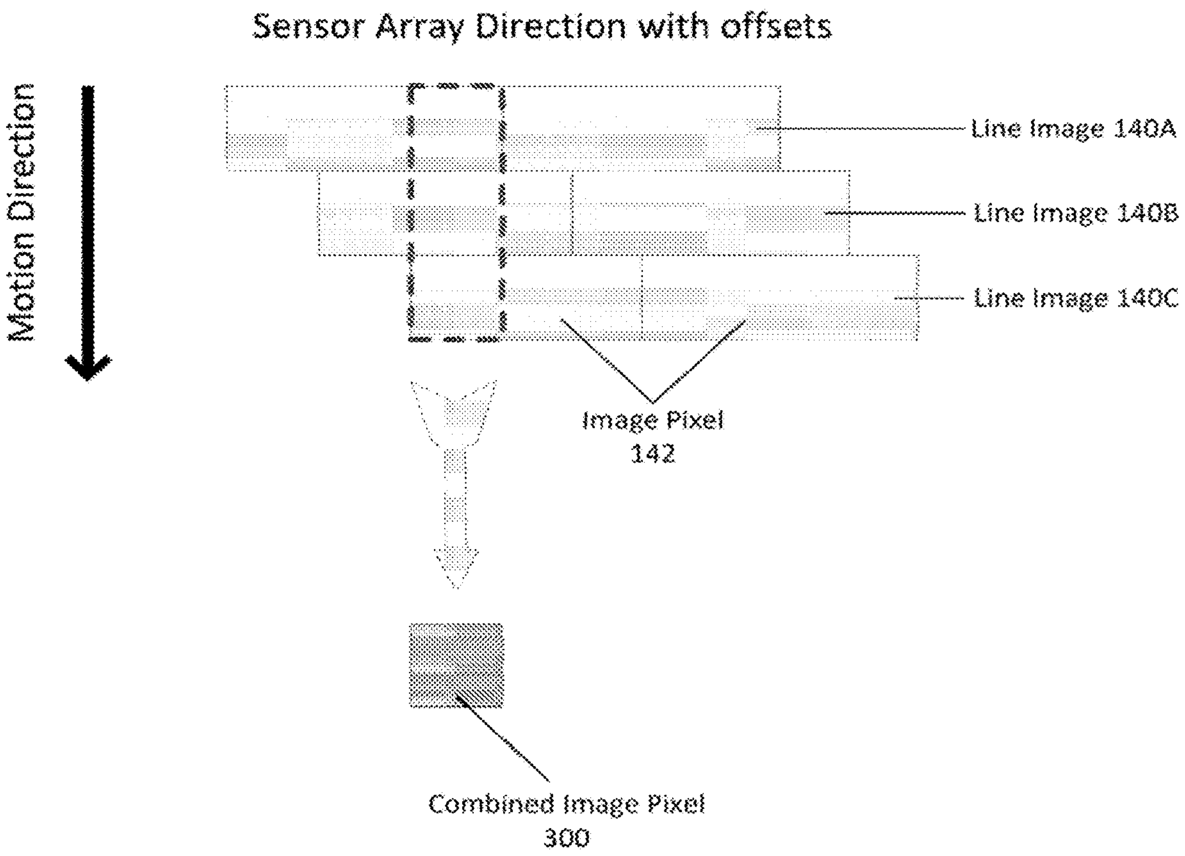
FIGS. 3A and 3B illustrate the stacking of pixels to form a subpixel, according to embodiments.
Figure 3B:
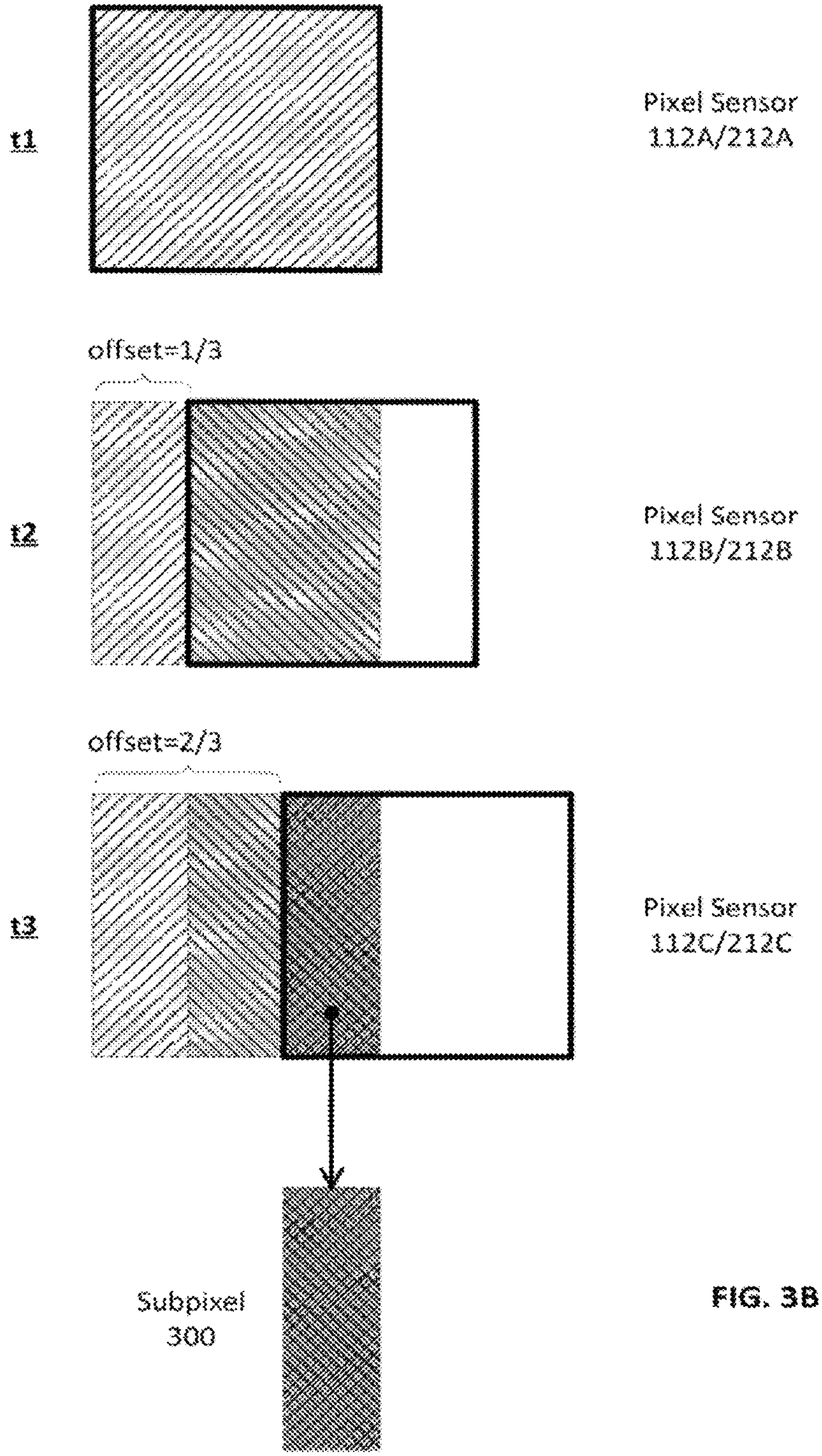

FIGS. 3A and 3B illustrate how three offset pixels from offset line images may be used to generate a subpixel that is one-third of a pixel length, according to two alternative embodiments. While FIGS. 3A and 3B illustrate the use of three offset pixels to generate a subpixel that is one-third the length of a pixel length, it should be apparent how this technique may be used with any N offset pixels to divide a pixel into N subpixels that are each 1/Nth of a pixel length.

FIG. 3A illustrates how rectangular pixels can be used to generate a combined image pixel 300. Each line sensor 110 produces a line image 140. Thus, for example, line sensor 110A produces line image 140A, line sensor 110B produces line image 140B, and line sensor 110C produces line image 140C. It should be understood that FIG. 3B only illustrates a partial segment of each line image 140. In the illustrated embodiment, each of line images 140 comprise rectangular image pixels 142. The length of image pixels 142 in the direction of motion may be controlled by adjusting the scan speed. As illustrated, when rectangular pixels 142 from each of line images 140 are combined, the combination results in a square image subpixel 300. The combination of the rectangular pixels 142 may comprise summing the intensity values of portions of each of the pixels 142, with the sum of those intensity values being used as subpixel 300.

While the embodiment illustrated in FIG. 3A uses rectangular pixels to produce square subpixels 300, the embodiment illustrated in FIG. 3B uses square pixels to produce rectangular subpixels 300. As illustrated in FIG. 3B, at time t1, pixel sensor 112A or 212A generates a first square pixel with zero offset. Next, at time t2, pixel sensor 112B or 212B generates a second square pixel with an offset of one-third the length of a pixel sensor 112 or 212. Finally, at time t3, pixel sensor 112C or 212C generates a third square pixel with an offset of two-thirds the length of a pixel sensor 112 or 212. The overlapping portions of the first, second, and third pixels are combined to generate rectangular subpixel 300. For example, the combination of the pixels may comprise summing the intensity values of each of the first, second, and third pixels, with the sum of those intensity values being used as subpixel 300. To obtain a square subpixel 300, using such an embodiment, the same subpixel operation may be repeated in the orthogonal direction.

This summation of pixels into subpixel 300 may be repeated for each set of offset pixels (i.e., collectively representing a single pixel of image data) captured by each pixel sensor 112 or 212 to generate N subpixels for each single pixel of image data, to thereby up-sample the resolution of a whole slide image by N times. In the example, illustrated herein, in which N=3, three subpixels are generated for each pixel of image data, producing an up-sampled image with three times the resolution.

Figure 4:
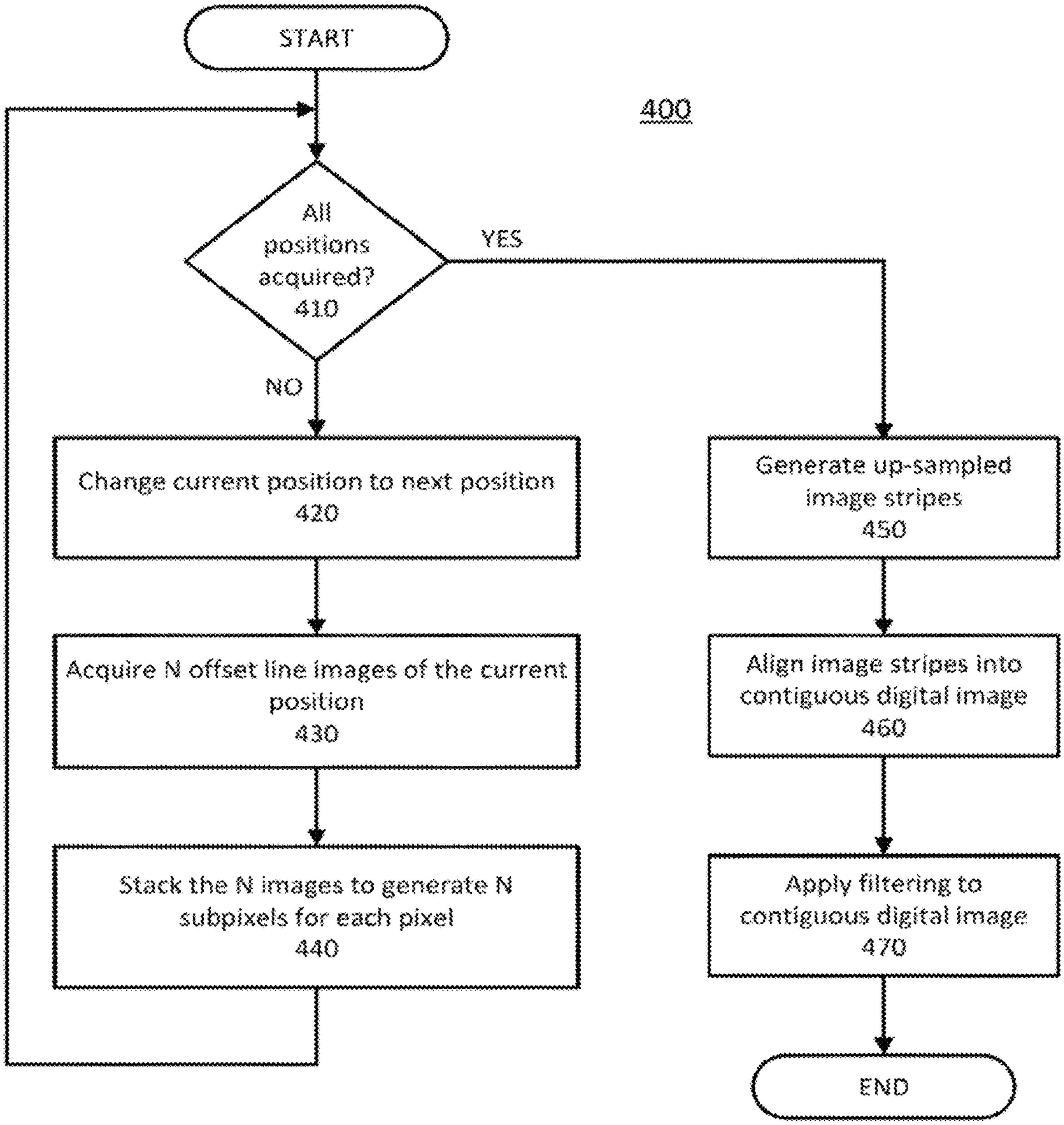
FIG. 4 illustrates a process of generating subpixel resolution for a digital image, according to an embodiment.

FIG. 4 illustrates a process 400 of generating subpixel resolution for a digital image (e.g., whole slide image), using the pixel-shifting technique of the first or second embodiments described herein, according to an embodiment. Process 400 may be referred to as "de-mosaicing," and may be implemented as software and/or hardware in a digital imaging device (e.g., as software stored in memory 565 and executed by processor(s) 555 of device 550). Process 400 may be performed after or in parallel with the scanning of a sample (i.e., the generation of line images using sensor 100 or 200).

In step 410, it is determined whether or not all line images—each representing a position within a region of interest on a sample (e.g., a portion of the sample or the entire sample or slide)—have been acquired. If line images, representing additional positions, remain to be acquired (i.e., "NO" in step 410), process 400 proceeds to step 420. Otherwise, if all line images have been acquired (i.e., "YES" in step 410), process 400 proceeds to step 450.

In step 420, a current position is changed to a next position, for which line images are to be acquired. It should be understood that, at the beginning of process 400, the next position in step 420 will represent the starting position from which line images are to be acquired.

In step 430, N offset line images of the current position are acquired. As described elsewhere herein, each line image represents an image of the same position, but offset by increments of 1/Nth of a pixel length. Collectively, the N offset line images represent the current position at offsets from zero to (N−1)/Nth of a pixel length.

In step 440, each of the N offset line images, acquired in step 430, are stacked to generate N subpixels for each pixel in the resulting stacked line image. Each pixel in the offset line images may be stacked as described elsewhere herein (e.g., with respect to FIGS. 3A and 3B). After step 440, process 400 returns to step 410.

Once it has been determined that all line images, representing an entire region of interest to be imaged on the sample, have been acquired in step 410, process 400 proceeds to step 450. In step 450, the acquired line images are combined into image stripes or tiles. The resulting image stripes or tiles are N times the resolution of image stripes or tiles that have not been up-sampled using the subpixels generated in step 440.

In step 460, the up-sampled image stripes or tiles are aligned into a contiguous digital image (e.g., a whole slide image).

In step 470, one or more filters are applied to the contiguous digital image to, for example, reduce noise (e.g., edge effects resulting from "stitching" the image stripes or tiles together, etc.), and process 400 ends.

4. Exemplary Digital Imaging Device

FIG. 5A is a block diagram illustrating an example processor-enabled device 550 that may be used in connection with various embodiments described herein. In the illustrated embodiment, the device 550 is presented as a digital imaging device (also referred to herein as a digital slide scanner, scanner system, or scanning system) that comprises one or more processors 555, one or more memories 565, one or more motion controllers 570, one or more interface systems 575, one or more movable stages 580 that each support one or more glass slides 585 with one or more samples 590, one or more illumination systems 595 that illuminate the sample, one or more objective lenses 600 that each define an optical path 605 that travels along an optical axis, one or more objective lens positioners 630, one or more optional epi-illumination systems 635 (e.g., included in a fluorescence scanner system), one or more focusing optics 610, one or more line scan cameras 615 and/or one or more area scan cameras 620, each of which define a separate field of view 625 on the sample 590 and/or glass slide 585. The various elements of digital imaging device 550 are communicatively coupled via one or more communication busses 560. Although there may be one or more of each of the various elements of digital imaging device 550, for simplicity in the description that follows, these elements will be described in the singular except when needed to be described in the plural to convey the appropriate information. Alternative forms of digital imaging device 550 may also be used as will be understood by the skilled artisan.

One or more processors 555 may include, for example, a central processing unit ("CPU") and a separate graphics processing unit ("GPU") capable of processing instructions in parallel, or processor 555 may include a multicore processor capable of processing instructions in parallel. Additional separate processors may also be provided to control particular components or perform particular functions such as image processing. For example, additional processors may include an auxiliary processor to manage data input, an auxiliary processor to perform floating point mathematical operations, a special-purpose processor having an architecture suitable for fast execution of signal-processing algorithms (e.g., digital signal processor), a slave processor subordinate to the main processor (e.g., back-end processor), an additional processor for controlling line scan camera 615, stage 580, objective lens 600, and/or a display (not shown). Such additional processors may be separate discrete processors or may be integrated with processor 555.

Memory 565 provides storage of data and instructions for programs that can be executed by processor 555. Memory 565 may include one or more volatile and/or non-volatile computer-readable storage mediums that store the data and instructions, such as a random access memory (RAM), a read only memory (ROM), a hard disk drive, a removable storage drive, and/or the like. Processor 555 may be configured to execute instructions that are stored in memory 565 and communicate via communication bus 560 with the various elements of the digital imaging device 550 to carry out the overall function of digital imaging device 550.

One or more communication busses 560 may include a communication bus 560 that is configured to convey analog electrical signals and/or a communication bus 560 that is configured to convey digital data. Accordingly, communications from processor 555, motion controller 570, and/or interface system 575 via the one or more communication busses 560 may include electrical signals and/or digital data. Processor 555, motion controller 570, and/or interface system 575 may also be configured to communicate with one or more of the various elements of digital imaging device 550 via a wireless communication link.

Motion control system 570 is configured to precisely control and coordinate XYZ movement of stage 580 and/or objective lens 600 (e.g., via objective lens positioner 630). Motion control system 570 may also be configured to control movement of any other moving part in digital imaging device 550. For example, in a fluorescence scanner embodiment, motion control system 570 may be configured to coordinate movement of optical filters and the like in the epi-illumination system 635.

Interface system 575 allows digital imaging device 550 to interface with other systems and human operators. For example, interface system 575 may include a user interface (e.g., graphical user interface) to provide information directly to an operator and/or to allow direct input from an operator. Interface system 575 may also be configured to facilitate communication and data transfer between digital imaging device 550 and one or more local external devices that are directly connected (e.g., a printer, removable storage medium, etc.) and/or one or more remote external devices that are connected to digital imaging device 550 via a network (e.g., an image server, operator station, user station, administrative server, etc.).

Illumination system 595 may be configured to illuminate a portion of sample 590. For example, illumination system 595 may include a light source and illumination optics. The light source could be a variable intensity halogen light source with a concave reflective mirror to maximize light output and a KG-1 filter to suppress heat. The light source could also be any type of arc-lamp, laser, or other source of light. In an embodiment, illumination system 595 illuminates sample 590 in transmission mode, such that line scan camera 615 and/or area scan camera 620 sense optical energy that is transmitted through sample 590. Alternatively, or in combination, illumination system 595 may be configured to illuminate sample 590 in reflection mode, such that line scan camera 615 and/or area scan camera 620 sense optical energy that is reflected from sample 590. Overall, illumination system 595 is configured to be suitable for interrogation of microscopic sample 590 in any known mode of optical microscopy.

In an embodiment, digital imaging device 550 optionally includes an epi-illumination system 635 to optimize digital imaging device 550 for fluorescence scanning. Fluorescence scanning is the scanning of samples 590 that include fluorescence molecules, which are photon sensitive molecules that can absorb light at a specific wavelength (excitation). These photon sensitive molecules also emit light at a higher wavelength (emission). Because the efficiency of this photoluminescence phenomenon is very low, the amount of emitted light is often very low. This low amount of emitted light typically frustrates conventional techniques for scanning and digitizing sample 590 (e.g., transmission mode microscopy). Advantageously, in a fluorescence scanner system embodiment of digital imaging device 550, use of a line scan camera 615 that includes multiple linear sensor arrays (e.g., a time delay integration ("TDI") line scan camera) increases the sensitivity to light of line scan camera 615 by exposing the same area of sample 590 to each of the multiple linear sensor arrays of line scan camera 615. This is particularly useful when scanning faint fluorescence samples with low emitted light.

Accordingly, in a fluorescence scanner system embodiment, line scan camera 615 is preferably a monochrome TDI line scan camera. Monochrome images are ideal in fluorescence microscopy, because they provide a more accurate representation of the actual signals from the various channels present on sample 590. As will be understood by those skilled in the art, a fluorescence sample 590 can be labeled with multiple florescence dyes that emit light at different wavelengths, which are also referred to as "channels."

Furthermore, because the low-end and high-end signal levels of various fluorescence samples 590 present a wide spectrum of wavelengths for line scan camera 615 to sense, it is desirable for the low-end and high-end signal levels that line scan camera 615 can sense to be similarly wide. Accordingly, in a fluorescence scanner embodiment, line scan camera 615 used in digital imaging device 550 is a monochrome 10-bit 64-linear-array TDI line scan camera. It should be noted that a variety of bit depths for line scan camera 615 can be employed for use with a fluorescence scanner embodiment of digital imaging device 550.

In an embodiment, movable stage 580 is configured for precise XY movement under control of processor 555 or motion controller 570. Movable stage 580 may also be configured for Z movement under control of processor 555 or motion controller 570. Moveable stage 580 may be configured to position sample 590 in a desired location during image capture by line scan camera 615 and/or area scan camera 620. Moveable stage 580 may also be configured to accelerate sample 590 in a scanning direction to a substantially constant velocity and then maintain the substantially constant velocity during image capture by line scan camera 615. In an embodiment, digital imaging device 550 may employ a high precision and tightly coordinated XY grid to aid in the location of sample 590 on movable stage 580. In an embodiment, movable stage 580 is a linear motor based XY stage with high precision encoders employed on both the X and the Y axis. For example, very precise nanometer encoders can be used on the axis in the scanning direction and on the axis that is in the direction perpendicular to the scanning direction and on the same plane as the scanning direction. Stage 580 may also be configured to support glass slide 585 upon which sample 590 is disposed.

Sample 590 can be anything that may be interrogated by optical microscopy. For example, a glass microscope slide 585 is frequently used as a viewing substrate for specimens that include tissues and cells, chromosomes, DNA, protein, blood, bone marrow, urine, bacteria, beads, biopsy materials, or any other type of biological material or sub stance that is either dead or alive, stained or unstained, labeled or unlabeled. Sample 590 may also be an array of any type of DNA or DNA-related material such as cDNA, RNA, or protein that is deposited on any type of slide or other substrate, including any and all samples commonly known as a microarrays. Sample 590 may be a microtiter plate, for example a 96-well plate. Other examples of sample 590 include integrated circuit boards, electrophoresis records, petri dishes, film, semiconductor materials, forensic materials, or machined parts.

In an embodiment, objective lens 600 is mounted on objective positioner 630, which may employ a very precise linear motor to move objective lens 600 along the optical axis defined by objective lens 600. For example, the linear motor of objective lens positioner 630 may include a 50-nanometer encoder. The relative positions of stage 580 and objective lens 600 in XYZ axes are coordinated and controlled in a closed loop manner using motion controller 570 under the control of processor 555 that employs memory 565 for storing information and instructions, including the computer-executable programmed steps for overall operation of digital imaging device 550.

In an embodiment, objective lens 600 is a plan apochromatic ("APO") infinity corrected objective with a numerical aperture corresponding to the highest spatial resolution desirable, where objective lens 600 is suitable for transmission mode illumination microscopy, reflection mode illumination microscopy, and/or epi-illumination mode fluorescence microscopy (e.g., an Olympus 40×, 0.75 NA or 20×, 0.75 NA). Advantageously, objective lens 600 may be capable of correcting for chromatic and spherical aberrations. When objective lens 600 is infinity corrected, focusing optics 610 can be placed in optical path 605 above objective lens 600 where the light beam passing through the objective lens becomes a collimated light beam. Focusing optics 610 focus the optical signal captured by objective lens 600 onto the light-responsive elements of line scan camera 615 and/or area scan camera 620, and may include optical components such as filters, magnification changer lenses, and/or the like. Objective lens 600, combined with focusing optics 610, provides the total magnification for digital imaging device 550. In an embodiment, focusing optics 610 may contain a tube lens and an optional 2× magnification changer. Advantageously, the 2× magnification changer allows a native 20× objective lens 600 to scan sample 590 at 40× magnification.

In an embodiment, line scan camera 615 comprises at least one linear array of picture elements ("pixels"). The line scan camera may be monochrome or color. Color line scan cameras typically have at least three linear arrays, while monochrome line scan cameras may have a single linear array or plural linear arrays. Any type of singular or plural linear array, whether packaged as part of a camera or custom-integrated into an imaging electronic module, can also be used. For example, a 3-linear-array ("red-green-blue" or "RGB") color line scan camera or a 96-linear-array monochrome TDI may be used. TDI line scan cameras typically provide a substantially better signal-to-noise ratio ("SNR") in the output signal by summing intensity data from previously imaged regions of a specimen, yielding an increase in the SNR that is in proportion to the square-root of the number of integration stages. TDI line scan cameras comprise multiple linear arrays. For example, TDI line scan cameras are available with 24, 32, 48, 64, 96, or even more linear arrays. Digital imaging device 550 also supports linear arrays that are manufactured in a variety of formats, including some with 512 pixels, some with 1024 pixels, and others having 4096 or more pixels. Similarly, linear arrays with a variety of pixel sizes can also be used in digital imaging device 550. The salient requirement for the selection of any type of line scan camera 615 is that the motion of stage 580 can be synchronized with the line rate of line scan camera 615, so that stage 580 can be in motion with respect to line scan camera 615 during the image capture of sample 590.

The image data generated by line scan camera 615 may be stored in memory 565 and processed by processor 555 to generate a contiguous digital image of at least a portion of sample 590. The contiguous digital image can be further processed by processor 555, and the revised contiguous digital image can also be stored in memory 565.

In an embodiment with two or more line scan cameras 615, at least one of line scan cameras 615 can be configured to function as a focusing sensor that operates in combination with at least one of line scan cameras 615 that is configured to function as an imaging sensor. The focusing sensor can be logically positioned on the same optical path as the imaging sensor, or the focusing sensor may be logically positioned before or after the imaging sensor with respect to the scanning direction of digital imaging device 550. In such an embodiment with at least one line scan camera 615 functioning as a focusing sensor, the image data generated by the focusing sensor may be stored in memory 565 and processed by processor 555 to generate focus information to enable digital imaging device 550 to adjust the relative distance between sample 590 and objective lens 600 to maintain focus on sample 590 during scanning.

In operation, the various components of digital imaging device 550 and the programmed modules stored in memory 565 enable automatic scanning and digitizing of sample 590, which is disposed on glass slide 585. Glass slide 585 may be securely placed on movable stage 580 of digital imaging device 550 for scanning sample 590. Under control of processor 555, movable stage 580 accelerates sample 590 to a substantially constant velocity for sensing by line scan camera 615, where the speed of stage 580 is synchronized with the line rate of line scan camera 615. After scanning a stripe of image data, movable stage 580 decelerates and brings sample 590 to a substantially complete stop. Movable stage 580 then moves orthogonal to the scanning direction to position sample 590 for scanning of a subsequent stripe of image data (e.g., an adjacent stripe). Additional stripes are scanned until an entire portion of sample 590 or the entire sample 590 is scanned.

For example, during digital scanning of sample 590, a contiguous digital image of sample 590 may be acquired as a plurality of contiguous fields of view that are combined together to form an image stripe. A plurality of adjacent image stripes are similarly combined together to form a contiguous digital image of a portion or the entire sample 590. The scanning of sample 590 may include acquiring vertical image stripes or horizontal image stripes. The scanning of sample 590 may be either top-to-bottom, bottom-to-top, or both (bi-directional), and may start at any point on sample 590. Alternatively, the scanning of sample 590 may be either left-to-right, right-to-left, or both (bi-directional), and may start at any point on sample 590. Additionally, it is not necessary that image stripe s be acquired in an adjacent or contiguous manner. Furthermore, the resulting image of sample 590 may be an image of the entire sample 590 or only a portion of sample 590.

In an embodiment, computer-executable instructions (e.g., programmed modules or software) are stored in memory 565 and, when executed, enable digital imaging device 550 to perform the various functions described herein. In this description, the term "computer-readable storage medium" is used to refer to any media used to store and provide computer executable instructions to digital imaging device 550 for execution by processor 555. Examples of these media include memory 565 and any removable or external storage medium (not shown) communicatively coupled with digital imaging device 550, either directly or indirectly, for example via a network (not shown).

FIG. 5B illustrates a line scan camera 615 having a single linear array 640, which may be implemented as a charge coupled device ("CCD") array. The single linear array 640 comprises a plurality of individual pixels 645. In the illustrated embodiment, the single linear array 640 has 4096 pixels 645. In alternative embodiments, linear array 640 may have more or fewer pixels 645. For example, common formats of linear arrays include 512, 1024, and 4096 pixels 645. Pixels 645 are arranged in a linear fashion to define a field of view 625 for linear array 640. The size of field of view 625 varies in accordance with the magnification of digital imaging device 550.

FIG. 5C illustrates a line scan camera 615 having three linear arrays, each of which may be implemented as a CCD array. The three linear arrays combine to form a color array 650. In an embodiment, each individual linear array in color array 650 detects a different color intensity (e.g., red, green, or blue). The color image data from each individual linear array in color array 650 is combined to form a single field of view 625 of color image data.

FIG. 5D illustrates a line scan camera having a plurality of linear arrays, each of which may be implemented as a CCD array. The plurality of linear arrays collectively form a TDI array 655. Advantageously, a TDI line scan camera may provide a substantially better SNR in its output signal by summing intensity data from previously imaged regions of a specimen, yielding an increase in the SNR that is in proportion to the square-root of the number of linear arrays (also referred to as integration stages). A TDI line scan camera may comprise a larger variety of numbers of linear arrays. For example, common formats of TDI line scan cameras include 24, 32, 48, 64, 96, 120, and even more linear arrays.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. An imaging device for a slide scanning device comprising:

a line scan camera comprising a two-dimensional array of pixel sensors, wherein the two-dimensional array comprises columns parallel to a first axis and rows parallel to a second axis that is orthogonal to the first axis;

wherein the line scan camera is configured to successively receive a same field of view of a sample to each of a plurality of rows in the two-dimensional array provided by an objective lens; and at least one hardware processor configured to, for each of a plurality of positions on the sample:

control one or more of the position of the sample, the objective lens, and the line scan camera, such that the field of view of the sample, provided to the plurality of rows in the two-dimensional array, moves across the plurality of rows in the two-dimensional array at a non-zero angle with respect to the first axis and the second axis, such that each row in the plurality of rows senses the same field of view at an offset equal to a different fraction of a length of each pixel sensor, combine line images of the same field of view, to produce a plurality of subpixels for each of at least a subset of pixels within the line images of the same field of view, wherein the defined shape of each of the pixels is sized to generate square shaped subpixels when the line images are combined, generate an up-sampled line image of the position comprising the produced plurality of subpixels, and combine the up-sampled line images of each of the plurality of positions on the sample into an image.

2. The slide scanning device of claim 1, wherein the position of the sample is controlled by controlling a motorized stage on which the sample is positioned to move relative to the objective lens.

3. The slide scanning device of claim 1, wherein the plurality of rows consists of N rows, and wherein the angle with respect to the first axis is equal to an arctangent of 1/N.

4. The slide scanning device of claim 3, wherein, for each of the plurality of positions on the sample, the line images of the same field of view comprise a line image for N offsets from zero to (N−1)/N.

5. A method comprising using at least one hardware processor to:

receive image data from a line scan camera comprising a two-dimensional array of pixel sensors, wherein the two-dimensional array comprises columns parallel to a first axis and rows parallel to a second axis that is orthogonal to the first axis;

receive successively a same field of view of a sample to each of a plurality of rows in the two-dimensional array provided by an objective lens;

for each of a plurality of positions on the sample:

control one or more of the position of the sample, the objective lens, and the line scan camera, such that the field of view of the sample, provided to the plurality of rows in the two-dimensional array, moves across the plurality of rows in the two-dimensional array at a non-zero angle with respect to the first axis and the second axis, such that each row in the plurality of rows senses the same field of view at an offset equal to a different fraction of a length of each pixel sensor, combine line images of the same field of view, to produce a plurality of subpixels for each of at least a subset of pixels within the line images of the same field of view, wherein the defined shape of each of the pixels is sized to generate square shaped subpixels when the line images are combined, generate an up-sampled line image of the position comprising the produced plurality of subpixels; and combine the up-sampled line images of each of the plurality of positions on the sample into an image.

6. The method of claim 5, wherein the method comprises controlling the position of the sample by controlling a motorized stage on which the sample is positioned to move relative to the objective lens.

7. The method of claim 5, wherein the plurality of rows consists of N rows, and wherein the angle with respect to the first axis is equal to an arctangent of 1/N.

8. The method of claim 5, wherein, for each of the plurality of positions on the sample, the line images of the same field of view comprise a line image for N offsets from zero to (N−1)/N.

9. A non-transitory computer-readable having instructions stored thereon, wherein the instructions, when executed by a processor, cause the processor to:

receive image data from a line scan camera comprising a two-dimensional array of pixel sensors, wherein the two-dimensional array comprises columns parallel to a first axis and rows parallel to a second axis that is orthogonal to the first axis;

receive successively a same field of view of a sample to each of a plurality of rows in the two-dimensional array provided by an objective lens;

for each of the plurality of positions on the sample;

control one or more of the position of the sample, the objective lens, and the line scan camera, such that the field of view of the sample, provided to the plurality of rows in the two-dimensional array, moves across the plurality of rows in the two-dimensional array at a non-zero angle with respect to the first axis and the second axis, such that each row in the plurality of rows senses the same field of view at an offset equal to a different fraction of a length of each pixel sensor, combine line images of the same field of view, to produce a plurality of subpixels for each of at least a subset of pixels within the line images of the same field of view, wherein the defined shape of each of the pixels is sized to generate square shaped subpixels when the line images are combined, generate an up-sampled line image of the position comprising the produced plurality of subpixels; and combine the up-sampled line images of each of the plurality of positions on the sample into an image.

10. The non-transitory computer readable medium of claim 9, wherein the position of the sample is controlled by controlling a motorized stage on which the sample is positioned to move relative to the objective lens.

11. The non-transitory computer readable medium of claim 9, wherein the plurality of rows consists of N rows, and wherein the angle with respect to the first axis is equal to an arctangent of 1/N.

12. The non-transitory computer readable medium of claim 9, wherein, for each of the plurality of positions on the sample, the line images of the same field of view comprise a line image for N offsets from zero to (N−1)/N.

* * * * *